UNITED STATES PATENT OFFICE.

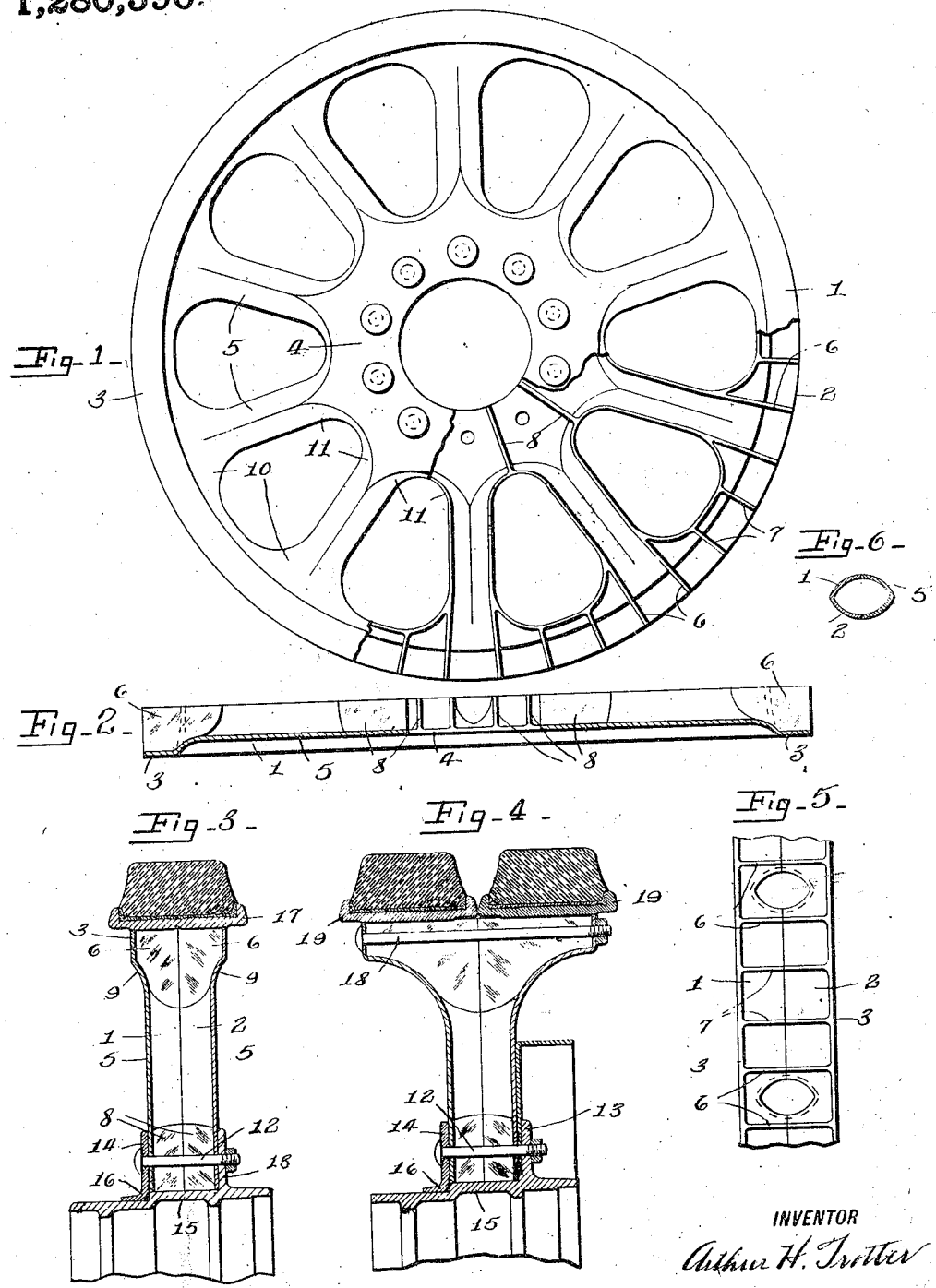

ARTHUR H. TROTTER, OF SYRACUSE, NEW YORK.

SECTIONAL HOLLOW METAL WHEEL.

1,280,590.   Specification of Letters Patent.   Patented Oct. 1, 1918.

Application filed August 26, 1916. Serial No. 117,063.

*To all whom it may concern:*

Be it known that I, ARTHUR H. TROTTER, a citizen of the United States, and a resident of Syracuse, in the county of Onondaga and State of New York, have invented a certain new and useful Sectional Hollow Metal Wheel, of which the following is a specification.

This invention has for its object a metal sectional hollow wheel, which is particularly simple in construction, readily and economically manufactured, and highly efficient and durable in use; and it consists in the novel features and the combinations and constructions hereinafter set forth and claimed.

In describing this invention, reference is had to the accompanying drawings in which like characters designate corresponding parts in all the views.

Figure 1 is a side elevation, partly broken away, of a preferable form of my wheel.

Fig. 2 is a sectional view through one of the side sections of the wheel.

Fig. 3 is a fragmentary cross sectional view, a tire being shown thereon.

Fig. 4 is a view similar to Fig. 3 of a modified form of my invention.

Fig. 5 is a developed plan view of the periphery of the wheel body.

Fig. 6 is a cross-sectional view through opposing spoke sections.

This hollow metal wheel comprises a body preferably composed of two opposing side sections, each of which includes felly and hub divisions or parts and spoke divisions or parts and means for fastening the wheel sections together.

The wheel is composed of sections separable along a plane arranged at an angle to the axis of the wheel and dividing the spokes longitudinally and intersecting the felly and the hub between the opposite sides thereof.

1 and 2 designate the side sections which in this embodiment of my invention are shown as duplicates, although they are not necessarily duplicates. Each section includes an annular felly division or part 3, a hub division or part 4 and spoke divisions or parts 5. The felly of the wheel is open at its periphery and the felly divisions or parts all provided with transverse substantially radially extending webs or braces 6 and 7 which, in the illustrated form of my invention, are shown as arranged in transverse alinement.

The hub of the wheel is also formed with the wall of its bore open, and the hub sections 4 are provided with radially extending webs or braces 8, the webs of the hub sections being preferably arranged in alinement and meeting in the plane dividing the wheel sections.

The spoke divisions or parts 5 widen at their upper ends as they approach their respective felly divisions or sections, both laterally toward the outer faces of the side sections and in directions circumferentially of the wheel, as designated at 9 and 10. The webs 6 extend into the widened outer ends of the spoke divisions or sections while the webs 7 are spaced between the webs 6. The spoke divisions or parts, at their inner ends also widen in a direction circumferentially of the hub as at 11.

The wheel sections, 1 and 2 are secured together from lateral displacement, at the hub and felly, and as here shown, they are secured together at the hub by transverse fastening members as bolts 12 extending through the hub divisions or parts, and through flanges 13 and 14 engaging opposite ends of the hub, and provided respectively on a bearing sleeve 15 extending through the central bore of the hub and on a collar 16 mounted on the sleeve. The wheel sections 1, 2 may be secured at the felly by a press-on tire rim 17, or by bolts 18, Fig. 4, extending transversely through the felly divisions or parts.

The press-on tire rim 17 is usually employed when the single tire is used, and the bolts 18 applied when the double tire is used, each mounted on its individual rim 19 on one wheel section. When demountable rims are used, the bolts employed to hold said rims in position also hold the wheel sections together. Brake bands may be secured to the wheels in any suitable manner as between one of the flanges 13, 14 and the hub sections or by bolts passed through the spokes.

Owing to the arrangement of the sections of the wheel, the wheel is more economical in manufacture than a one piece hollow metal wheel, as the casting operation does not involve the casting problems, involved in the one piece cast wheel, as will be apparent to those skilled in the art, and furthermore it can be cast thinner than a one piece wheel as no core is used.

What I claim is:

1. A sectional hollow wheel comprising a body composed of opposing separable side sections, each having annular felly and hub divisions and spoke divisions, the periphery of the felly being open, each felly division having transverse internal radial webs having their outer edges substantially flush with the peripheries of the side flanges of the felly divisions, and a tire rim pressed on the felly and engaging said webs, substantially as and for the purpose described.

2. A sectional hollow wheel comprising a body composed of opposing separable side sections, each having annular felly and hub divisions and spoke divisions, the felly being open at its periphery and each felly division having transverse internal radial webs substantially flush with the periphery of the felly and the hub divisions having internal transverse radial webs between the spoke divisions and the bore of the hub being opened and the edges of the last mentioned webs being flush with the wall of the bore of the hub, a press-on tire rim on the felly and engaging the edges of the webs in the felly division and a sleeve in the hub engaging the edges of the webs in the hub, substantially as and for the purpose specified.

In testimony whereof, I have hereunto signed my name, at Syracuse, in the county of Onondaga, and State of New York, this 27th day of June, 1916.

ARTHUR H. TROTTER.